(12) United States Patent
Bernstein et al.

(10) Patent No.: US 8,176,814 B1
(45) Date of Patent: May 15, 2012

(54) WIRE FORMING PLIER AND ELECTRICAL MULTI-TOOL

(76) Inventors: Steven J Bernstein, Lake Worth, FL (US); Stephanie L Schmidt, Lake Worth, FL (US)

( * ) Notice: Subject to any disclaimer, the term of this patent is extended or adjusted under 35 U.S.C. 154(b) by 131 days.

(21) Appl. No.: 12/543,987

(22) Filed: Aug. 19, 2009

(51) Int. Cl.
  *H02G 1/12* (2006.01)
  *B25B 7/02* (2006.01)
  *B25F 1/00* (2006.01)

(52) U.S. Cl. .................. 81/9.4; 7/107; 81/426

(58) Field of Classification Search ............ 81/9.4, 81/426.5, 426, 186, 418, 421–424, 416; 7/107; 29/556.4, 751; 72/409.14; 140/102.5, 104, 140/106, 123
See application file for complete search history.

(56) References Cited

U.S. PATENT DOCUMENTS

| | | | | |
|---|---|---|---|---|
| 309,976 A | * | 12/1884 | Oehler | 81/426 |
| 995,754 A | * | 6/1911 | Young | 81/423 |
| 1,546,989 A | * | 7/1925 | Morris | 81/186 |
| 6,386,076 B1 | * | 5/2002 | Swanstrom, Jr. | 81/423 |
| 7,814,817 B1 | * | 10/2010 | Sheriff | 81/423 |
| 2009/0199344 A1 | * | 8/2009 | Grayson et al. | 81/426.5 |

FOREIGN PATENT DOCUMENTS

DE  3121280 A1 * 1/1983

* cited by examiner

*Primary Examiner* — Hadi Shakeri
(74) *Attorney, Agent, or Firm* — Daniel S. Polley, P.A.

(57) ABSTRACT

A wire forming plier and electrical multi-tool for the purpose of forming, stripping, crimping and cutting electrical wire is disclosed. The plier features two arms overlapped and pivoted together; the posterior ends of the arms serve as handles. Two symmetrically shaped round barrels, different in size, identified with indicia, extend from the anterior ends of the plier arms for the purpose of forming a controlled bend in electrical wires/conductors of varying thicknesses/gauges to fit around specific terminal screw/stud sizes. As the handles are squeezed together, the cylindrical tips will grasp the electrical conductor by applying pressure to the wire between the round and smooth barrel surfaces. While the wire is securely held between the cylindrical tips the wire loop is quickly and easily formed around either barrel by manually rotating the entire tool about a longitudinal axis in either direction.

12 Claims, 6 Drawing Sheets

WIRE FORMING PLIER AND ELECTRICAL MULTI-TOOL

BACKGROUND OF THE INVENTION

1. Field of the Invention

The present invention relates generally to hand held electrical tools and particularly to a multi-purpose plier for the purpose of forming, stripping, crimping and cutting electrical wire.

2. Description of the Background Art

FIG. 1 shows a prior art conventional hand held multi-tool typically used to perform the steps outlined in the following text.

The guidelines for joining electrical wire to a screw terminal for the purpose of creating a mechanical pressure connection vary. *Wiring 1-2-3* (The Home Depot, 2005, Second Edition) home improvement book outlines a four step process for joining wire to a terminal using long-nose pliers (also known as chain-nose or needle-nose pliers). To create a loop at the end of the conductor the book suggests using long-nose pliers or the tip 25 of a pair of wire strippers (multi-tool) both of which have asymmetrical serrated jaws with sharp squared off edges. However, step 2 demonstrates two options; option A shows how to "bend a question mark" using long-nose pliers and option B shows how to "use a wire-bending screwdriver" to form a U-shaped loop. The book does not adopt a standard since these two methods create different loop geometries. The long-nose plier is pictured forming the conventional question mark while the wire-bending screwdriver creates a hook.

*You can Build: Wiring* (Sunset, 2009) home improvement book demonstrates a four step process for looping the end of a conductor. Just like in The Home Depot book, Sunset suggests to create a loop at the end of the conductor using long-nose pliers or the tip 25 of a pair of wire strippers (multi-tool) both of which have asymmetrical serrated jaws with sharp squared off edges. The same two options are provided—using the tip of a pair of wire strippers (multi-tool) or the "looping screwdriver" method. Again, the book does not adopt a standard since both methods of bending wire create different loop geometries. The multi-tool is pictured forming the conventional question mark. However, the pictures show the tool damaging the bare wire by creating nicks and scratches during the four step wire forming process. The two pictures that demonstrate attaching wire to a screw-down terminal show a bare conductor severely mutilated from the sharp serrated alligator jaws of the long-nose plier. The book states that "[s]urface nicks, like the ones visible in the four steps on the opposite page, are not a concern." However, section 110.14 (A) of the 2008 National Electric Code (NEC) states that connection of conductors to terminal parts shall ensure a thoroughly good connection without damaging the conductors and shall be made by means of pressure connectors (including set-screw type), solder lugs, or splices to flexible leads. Also, terminal connections come under lots of stress when wired devices such as switches and receptacles are pushed into electrical boxes and any nicks will weaken the wire and may cause it to break no matter how superficial the marks may seem.

*Complete Wiring* (Stanley, 2008, Second Edition) home improvement book demonstrates a five step process for joining wire to a terminal. Just like in The Home Depot and Sunset books, Stanley suggests to create a loop at the end of the conductor using long-nose pliers or the tip 25 of a pair of wire strippers (multi-tool) both of which have asymmetrical serrated jaws with sharp squared off edges. The same two options are provided—using the tip of a pair of long-nose pliers or the "wire-bending screwdriver" method. The book states that the "handy" wire-bending screwdriver can form "a perfect loop every time" in wire ends. Again, the book does not adopt a standard since both methods of bending wire create different loop geometries. Both the long-nose and multi-tool pliers are pictured forming the conventional question mark.

The *Complete Guide to Wiring* (Black & Decker, 2008, Fourth Edition) home improvement book demonstrates a three step process for connecting wires to screw terminals. Step 2 shows a pair of "needle-nose" pliers forming a "C-shaped loop" and that "[t]he wire should have no scratches or nicks." Avoiding damage to the conductor is nearly impossible with long-nose pliers due to the sharp raised edges on the alligator jaw surfaces. The C-shaped loop pictured in the book is the same type of loop that the wire bending screwdriver is capable of forming.

All the books show either a long-nose plier or a multi-tool with a plier-nose 25, that acts much like a long-nose plier, grabbing the wire many times to form the bend in the wire. The more often the sharp plier-nose 25 is repositioned along the wire the more likely the wire is to become marked up and weakened. Section 110.14 (B) commentary text of the 2008 National Electric Code (NEC) presents the following "Installation Method" for correctly terminating wire at wire-binding screw terminals of receptacles and snap switches:

1. The freshly stripped end of the wire is wrapped two-thirds to three-quarters of the distance around the wire-binding screw post, . . . . The loop is made so that rotation of the screw during tightening will tend to wrap the wire around the post rather than unwrap it.
2. The screw is tightened until the wire is snugly in contact with the underside of the screw head and with the contact plate on the wiring device, . . . .
3. The screw is tightened an additional half-turn, thereby providing a firm connection, . . . .
4. The wires should be positioned behind the wiring device to decrease the likelihood of the terminal screws loosening when the device is positioned into the outlet box.

Three out of the four home improvement books suggest (after hooking a wire around a screw terminal) grabbing the wire on either side of the terminal screw with long-nose pliers and squeezing it around the screw post before tightening the terminal screw. Not only is this step unnecessary according to the preceding NEC commentary but this extra step will also create further damage to the wire when using the sharp serrated edges of a chain-nose plier or the tip 25 of a multi-tool to close the conductor loop. Also, since the thread crests of a terminal screw tend to be sharp, the thread crests could imprint the soft copper or aluminum conductor if the bare wire is pressed too firmly against the thread crests. Furthermore, as the screw is tightened the bare conductor tends to rotate and wrap itself around the terminal screw post to create the three-quarters distance that the preceding NEC commentary describes.

The wire bending screwdriver is an acceptable method for creating a "C-shaped loop" because according to the preceding NEC commentary the wire bending screwdriver creates a two-thirds wrap around the wire binding screw post before the screw is tightened. However, the wire bending screwdriver can be cumbersome to use because the bending spindle is inconveniently located in the middle of the tool where the shank of the screwdriver meets the base of the handle; thus the shank of the wire bending screwdriver tends to get in the way during an electrical installation. Also, the wire bending screwdriver as well as the long-nose (needle-nose or chain-nose) plier require the inconvenience of changing tools since the steps for terminating wire usually require stripping, cutting and forming the wire—not to mention the expense of having to purchase separate tools.

Forming wire loops is a nuisance using conventional long-nose pliers or the plier-nose 25 of a multi-tool. The tedious steps previously outlined in the home improvement books result in inconsistent loops no matter how much care and skill are used to form the controlled bend in the wire. Long-nose pliers have asymmetrical serrated jaws with sharp square surfaces that taper from the pivot to the tip. Most wire strippers and similar multi-tools maintain a convenient plier-nose 25 that are also asymmetrically shaped with sharp serrated jaws. Wire looping holes 27 punched through the jaws of multi-tools have sharp die cut edges that can cut into the wire when forming solid wire. These tools and or tool features are not ideal for bending wire because it is nearly impossible to form wire with a long-nose plier or a multi tool with a plier-nose 25 without cutting into the metal wire. Also, because plier nose 25 is irregularly shaped, repeating the same size wire loop can be difficult and unpredictable with a suffering consequence of creating a loop that may be too large or too small for the screw down terminal post.

Copper and aluminum wire are relatively soft metals according to the Mob's hardness scale and any nicks or scratches in the wire will severely weaken the conductor and may cause the wire to break. The minimal pressure required to form the wire is enough to mark the wire when using a metal surface that is not only sharp and square but also much harder than copper and aluminum. Joining wire to a terminal is an important skill and a key step in most electrical projects. Appropriately formed wire and properly joining wire to a terminal screw ensures the device works properly and doesn't develop a short. Section 110.14 (B) commentary text of the National Electric Code (NEC) states that field observations and trade magazine articles indicate that electrical connection failures have been determined to be the cause of many equipment burnouts and fires. Many of these failures are attributable to improper terminations, poor workmanship, the differing characteristics of dissimilar metals, and improper binding screws or splicing devices. Therefore, prevention is of the utmost importance when it comes to marking up the conductor. Not only is it dangerous but incorrectly forming wire and incorrectly terminating wire at wire-binding screw terminals of receptacles and snap switches wastes time and money by having to start the job over again.

Electrical pliers are very diverse. Some serve a single purpose while others serve multiple purposes. For example, a long-nose plier may only have the capability to cut and bend the electrical wire while another tool may cut, crimp and strip wire insulation from the conductor. Many combinations exist but all, if any, that feature sharp serrated jaws 25 or built-in wire looping holes 27, result in imperfect methods for forming wire and propose a high risk of damaging the wire. Electrical conductors of aluminum, copper-clad or copper are typically cylindrically shaped. Round wire should be formed with round symmetrical shapes with smooth surfaces not asymmetrical shapes with sharp square surfaces such as the typical long-nose plier or multi-tools that feature a plier nose 25.

Thus, what is needed in the art is an electrical multi-tool combined with a reliable forming feature that will accomplish the following:

1) quickly and easily perform controlled loops in metal wire of varying thicknesses/gauges by using round and smooth metal forms, each symmetrically shaped, to create consistent wire loops repeatedly;

2) quickly and easily perform controlled loops in metal wire of varying thicknesses/gauges by using round and smooth metal forms that are proportionally sized to specific terminal screw/stud sizes;

3) will not damage the metal wire or induce surface imperfections during the wire forming process by minimizing surface to surface contact between the round conductor and the round metal forms;

4) will not require the need to change tools since the forming feature is combined with a multi-tool;

5) maintain the slim and narrow profile of the tool for reaching into tight and/or crowded electrical enclosures and cavities as well as working with wire in confined spaces;

6) metal forming tips may also be used for holding, grabbing, gripping, twisting and pulling the wire.

It is therefore, to the effective resolution of the aforementioned problems and shortcomings that the present invention is directed.

SUMMARY OF THE INVENTION

The present invention discloses a multi-purpose plier for the purpose of forming, stripping, crimping and cutting electrical wire. The plier particularly revolutionizes the method of forming electrical conductors by allowing users to effectively and efficiently form wire of different gauges to screw/stud specific diameters.

The plier features two arms overlapped and pivoted together; the posterior ends of the arms serve, as handles. Two symmetrically shaped round barrels, different in size, identified with indicia, extend from the anterior ends of the plier arms for the purpose of forming a controlled bend in electrical wires/conductors of varying thicknesses/gauges to fit around specific terminal screw/stud sizes. As the handles are squeezed together, the cylindrical tips at the anterior ends of the plier arms will grasp the electrical conductor by applying pressure to the wire between the round and smooth barrel surfaces. While the wire is detained between the cylindrical tips of the tool the wire loop is quickly and easily formed around either barrel by manually rotating the entire tool about a longitudinal axis in either direction. Because the cylindrical tips of the plier are round and smooth, the barrel surfaces will not mar, score, nick, scratch or uncontrollably kink the wire— hence preserving the strength and integrity of the wire. Forming the wire around either barrel is swiftly performed in a single step with effortless motion.

The plier generally includes two cylindrical forming tips, different in size but each symmetrically shaped, to form wire around screws defined by the Unified Thread Standard (UTS) or ISO metric screw threads (M series threads).

The UTS defines a standard thread form and series along with allowances, tolerances, and designations for screw threads commonly used in the United States, Canada and Great Britain. The UTS is currently controlled by ASME/ANSI in the United States. UTS screw threads are specified by writing a number indicating the nominal (major) diameter of the thread followed by the number of threads per inch (course or fine). For diameters smaller than ¼ inch, the diameter is indicated by an integer or gauge number defined by the standard, for all other diameters, the inch figure is given.

ISO metric screw threads are the most common type of general-purpose screw thread used in the rest of the world. ISO metric screw threads are specified by writing the nominal (major) diameter of the thread followed by the pitch (course or fine) both expressed in millimeters. The letter M, which precedes the diameter, is the clue to the metric designation.

Thus, it should be understood that the present invention is not limited to just these two standards and that all thread standards are considered within the scope of the invention. However, since multiple standards exist, the following discussion will either specify or imply the Unified Thread Standard.

Generally 15 amp electrical devices such as wall switches and receptacles feature number eight terminal screws and 20 and 30 amp devices feature number ten terminal screws. Also, metal electrical boxes feature a tapped grounding hole to accommodate number ten grounding screws. Therefore, one barrel tip may be proportionally sized to form wire around number eight screws while the other barrel tip may be proportionally sized to form wire around number ten screws; however any barrel size combination for the purpose of forming wire around any size screw is within the scope of the invention.

Typically electrical switches and receptacles designed for side wire looping are mechanically capable of accommodating 12 to 14 American Wire Gauge (AWG) conductors. Section 110.14 (A) of the 2008 National Electric Code (NEC) states that connection by means of wire-binding screws or studs and nuts that have upturned lugs or the equivalent shall be permitted for 10 AWG or smaller conductors. However, electrical wire 10 AWG or thicker becomes difficult to form around terminal screws and therefore 10 AWG conductors or thicker typically terminate without the need for bending wire. For example, high voltage plugs and receptacles as well as circuit breakers are typically designed for insertion wire connections using set screws and pressure plate contacts. Back wire termination is also accomplished without the need for bending wire by inserting an electrical conductor into a wire well. Most receptacles and switches designed for side wire looping also have screwless pressure terminal connectors of the conductor push-in type in the back body of the device for easy insertion of wires into the holes. However, many professionals don't trust this method even though it saves time because the resulting electrical connection is not as secure as a connection made using a terminal screw that can be tightened to manufacture assigned torque values; 2008 NEC Commentary Tables 110.1 through 110.4 provide data on the tightening torques that Underwriters Laboratories uses in the event no tightening information on a specific wire connector is available. The professionals believe wire-binding screw terminal connections are more dependable. A wide variety of residential, commercial, industrial and hospital grade devices are designed to accommodate side wire terminal looping. The present invention may be used for not only joining wires to switches and receptacles but for any electrical connection that requires terminal looping such as electrical sockets, attachment plugs and cord connectors.

A lap joint is disclosed in the present invention in which one half of the plier overlaps the other; the pivot is set through both halves to secure the two arms together. The joint may feature nut and bolt style hardware or an adjustable rivet to keep the tool aligned and secure over years of use. Although a lap-style joint is disclosed, other joints are possible. In a box joint, one half of the plier joint surrounds the other half, and the pivot is hidden inside the tool. A box joint insures accurate alignment but limits the plier to open only as far as the box size. In a parallel joint, compound lever action keeps the plier tips perfectly parallel as the plier opens and closes. This ensures even pressure and helps prevent the conductor wire from being pushed out of the plier tips as pressure increases.

The plier may also feature insulated, dipped or molded grips. Insulated handles typically feature a high-dielectric coating that will protect against electrical shock from energized sources reducing the risk of injury. Dipped handles feature smooth or textured rubber coated sleeves for slip resistance and secure control as well as electrical shock protection. Molded grips provide increased comfort and leverage and may feature padding to cushion the thumb and fingers. Vinyl-covered handles, disclosed in the present invention, feature air-cushioned grips for comfort and control as well as easy-to-find brightly colored handles for quick identification.

Many pliers feature ergonomic handles such as contoured handles flared out or flared in to fit the natural grip of the hand. Such styles and shapes help to reduce muscle fatigue during high-volume wire stripping, cutting and crimping. However, the comfort grip handle forces the user to hold the tool right side up at all times. Symmetrical handles are preferred, disclosed in the present invention, since the tool can be held right side up or left side up to allow the user to appropriately position the forming tips in preparation for bending the wire in either direction. The posterior end of each plier arm may also feature a hole through the handle for hanging the tool from a hook or to accommodate a key ring, carabiner or metal loop for clipping the plier to a tool belt.

The plier may also be fitted with a single or double leaf spring or, as disclosed in an alternative version of the present invention, a coiled return spring riveted between the handles combined with a locking pawl or similar device for safe storage. A spring-loaded automatic opening reduces muscle fatigue and makes the plier particularly suited for repetitive work and smooth comfortable operation.

Other features of the plier may include:

a. Wire stripping station located anterior to the cutting station for removing insulation from both solid and stranded wire of different American Wire Gauges without damaging the conductor. Machine ground stripping holes provide a positive stop for precisely stripping wire of varying thicknesses gauges.

b. Crimping station located posterior to the pivot for connecting insulated and non-insulated ring, fork and butt splice terminals to different American Wire Gauges. Crimping station also includes dies for crimping coaxial connectors as well as auto ignition connectors.

c. Shearing station collapsed around the pivot for cutting and sizing the most popular sized bolts and screws defined by the Unified Thread Standard (UTS) as well as reforming threads defined by the UTS.

d. Cutting station located anterior to the pivot for cutting solid and stranded wire of different American Wire Gauges as well as NM (nonmetallic) sheathed cable.

Thus the present invention provides for a wire forming feature which is characterized as being able to quickly and easily form wire in one swift motion for the purpose of installing electrical conductors around standard screw sizes. A pressure termination ultimately secures the formed wire under the terminal screw head of the device. Damage to the wire is avoided and confidence and consistency is achieved during the repetitive process.

In the preferred embodiment of the invention the forming feature of the plier consists of two cylindrically shaped round barrels extending from the anterior ends of the plier arms for the purpose of forming electrical conductors of varying gauges to fit around specific stud sizes defined by the Unified Thread Standard. Both barrel diameters may be identical or both barrel diameters may be unique. For example, one barrel diameter may be proportioned to form wire around a number eight stud size typically found on electrical devices capable of securing electrical conductors formed around number eight wire-binding screw posts. The other barrel may be proportioned to form wire around a number ten stud size typically found on higher ampacity devices as well as steel electrical boxes having a tapped hole through the back wall of the electrical box to take the screw on the formed wire. These screws are typically used for grounding steel electrical boxes by securing the formed ground wire to the metal box. Two barrels of equal diameters are capable of forming wire to one specific stud size. However, either barrel is capable of forming the wire. Two barrels of different diameters are capable of forming wire to two specific stud sizes. The wire is formed around the plier barrel corresponding to the intended stud size. The barrels may be color coded to differentiate between the two in the event that the difference in barrel geometry is difficult to visually detect. For example, the color of one barrel may be different from the color of the other barrel with each color corresponding to the specific stud size. Each barrel may also display an imprinted number indelibly stamped (indicia) on the end surface, as disclosed in the present invention, to indicate the size of the barrel that corresponds to the specific stud size.

In an alternative embodiment the forming feature of the plier consists of two conically shaped tips extending from the anterior ends of the plier arms for the purpose of forming electrical conductors of varying gauges to fit around specific stud sizes defined by the Unified Thread Standard. Both truncated cone geometries may be identical or both truncated cone geometries may be unique. However, unlike the cylindrical tips, the conically shaped tips taper gradually and therefore are graduated in diameter and capable of forming wire of varying gauges to fit around many specific stud sizes—the smallest diameters around the anterior ends of the conical tips and the largest diameters around the posterior ends of the conical tips. For example, wire formed around the anterior end of one of the cones is capable of forming wire for smaller stud sizes than wire formed around the posterior end of one of the cones. Wire formed around the posterior end of one of the cones is capable of forming wire for lager stud sizes than wire formed around the anterior end of one of the cones. Two cones of equal geometry are capable of forming wire to an array of specific stud sizes. However, either cone is capable of forming the wire. Two cones of different geometry are capable of forming wire to an array of stud sizes greater than two cones of equal geometry. The wire is formed around the plier cone corresponding to the intended stud size. The truncated cones may be color coded to differentiate between the two in the event that the difference in conical geometry is difficult to visually detect. For example, the color of one cone may be different from the color of the other cone with each color corresponding to an array of specific stud sizes.

In an alternative embodiment the forming feature of the plier consists of two conically shaped tips extending from the anterior ends of the plier arms for the purpose of forming electrical conductors of varying gauges to fit around specific stud sizes defined by the Unified Thread Standard. Both truncated cone geometries may be identical or both truncated cone geometries may be unique. However, unlike the cylindrical tips, the conically shaped tips taper gradually and therefore are graduated in diameter and capable of forming wire of varying gauges to fit around many specific stud sizes—the smallest diameter around the anterior ends of the conical tips and the largest diameter around the posterior ends of the conical tips. For example, wire formed around the anterior end of one of the cones is capable of forming wire for smaller stud sizes than wire formed around the posterior end of one of the cones. Wire formed around the posterior end of one of the cones is capable of forming wire for lager stud sizes than wire formed around the anterior end of one of the cones. Two cones of equal geometry are capable of forming wire to an array of specific stud sizes. However, either cone is capable of forming the wire. Two cones of different geometry are capable of forming wire to an array of stud sizes greater than two cones of equal geometry. The wire is formed around the plier cone corresponding to the intended stud size. The truncated cones may be color coded to differentiate between the two in the event that the difference in conical geometry is difficult to visually detect. For example, the color of one cone may be different from the color of the other cone with each color corresponding to an array of specific stud sizes.

An object of this invention is to improve the method of forming electrical wire for connecting to screw terminals.

An object of this invention is to provide a practical method of forming wire by reducing the modus operandi to a one step profile.

An object of this invention is to provide a tool for bending wire that is characterized as simple and easy to use, eliminates errors, will not damage the wire, creates consistency, reduces waste and speeds the wire forming process.

The plier may be used to form round bare wire such as conductors having no covering or electrical insulation. However, the plier could be used to form flat sheet metal.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which.

DESCRIPTION OF THE PREFERRED EMBODIMENTS

Figure 1:
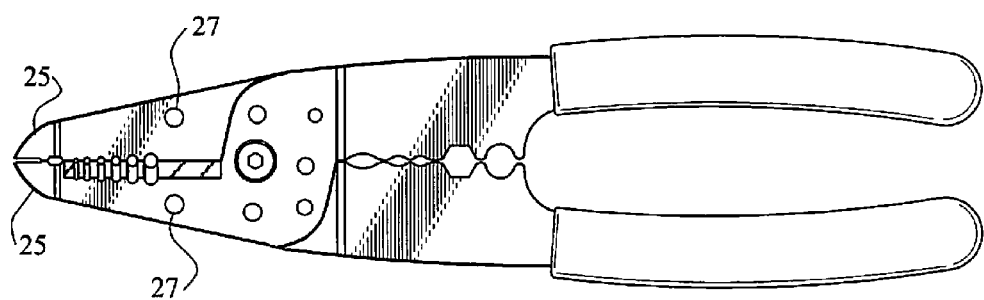
FIG. 1 is a "Prior Art" side view of a conventional hand held multi-tool in the closed position.
Figure 2:
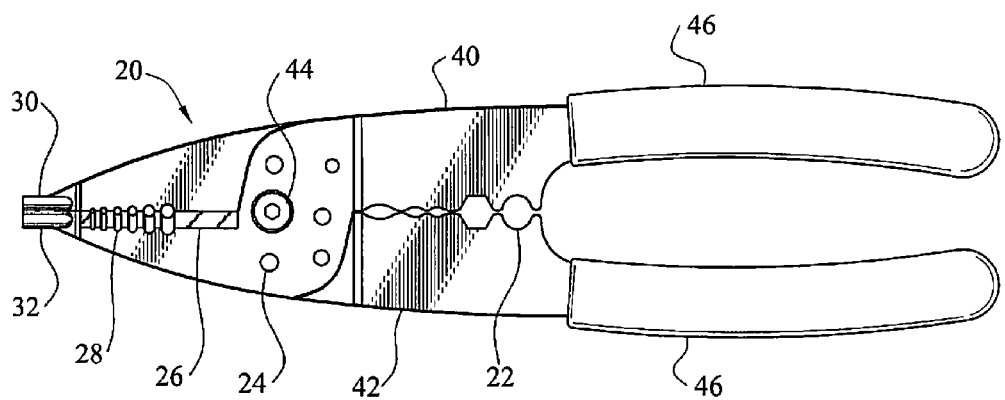
FIG. 2 is a side view of the present invention in the closed position illustrating the cylindrical wire forming tips.
Figure 3:
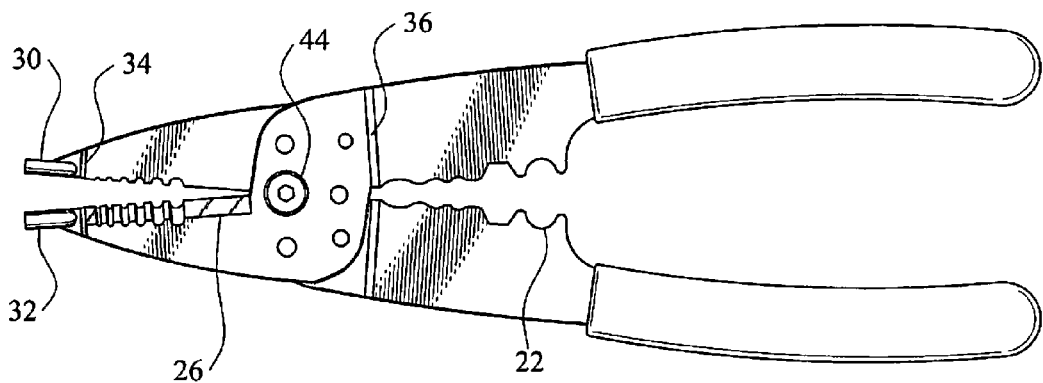
FIG. 3 is the same view as FIG. 2 but in the open position.
Figure 4:
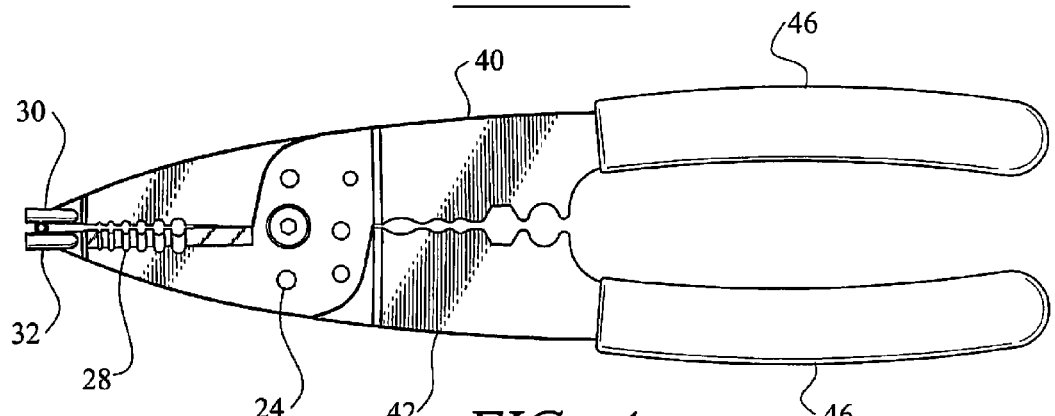
FIG. 4 is the same view as FIGS. 2 & 3 but holding a piece of wire between the forming tips.
Figure 5:
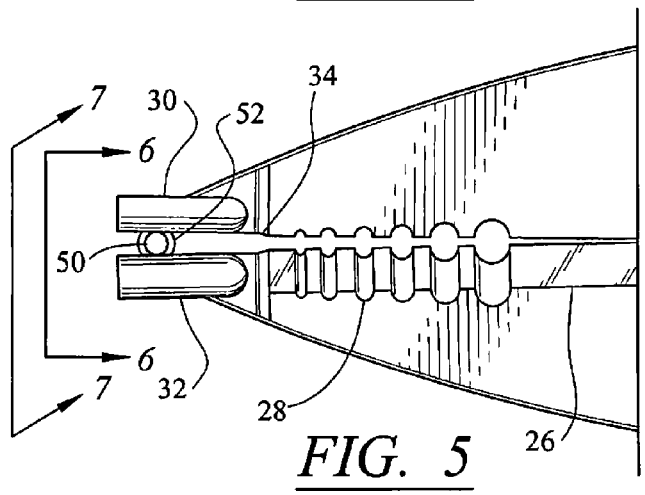
FIG. 5 is a blowup of FIG. 4 forward of the lap joint.

While the present invention is shown in its preferred embodiment as being utilized as a wire forming plier and electrical multi-tool, such is not limiting and many combinations exist. Thus, it should be understood that the present invention can be utilized in other pairings such as, but not limited to, the following matrix:

|  | Cutter | Stripper | Crimper |
|---|---|---|---|
| Wire Forming Tips | • |  |  |
| Wire Forming Tips |  | • |  |
| Wire Forming Tips |  |  | • |
| Wire Forming Tips | • | • |  |
| Wire Forming Tips | • |  | • |
| Wire Forming Tips |  | • | • |
| Wire Forming Tips | • | • | • |

Accordingly, all of these hand tool combinations for the present invention are considered within the scope of the invention.

The present invention is best illustrated by referring to FIGS. 2-7B which show the details of the hand held wire forming plier and electrical multi-tool generally indicated by reference number 20. Tool 20 includes a top arm 40 and bottom arm 42 overlapped and pivoted together at joint 44. The posterior ends of arms 40 and 42 also serve as handles 46. Tool 20 includes a crimping station 22 between handles 46 and joint 44, a wire cutting station 26 between joint 44 and stripping station 28, a stripping station 28 between wire cutting station 26 and forming tips 30 and 32 and forming tips 30 and 32 extending from the anterior ends of top arm 40 and bottom arm 42. Tool 20 also includes a bolt cutting/shearing station 24 collapsed around joint 44.

Tool 20 can be divided into an overlap region, a contact region and an alignment region. The overlap region consists of the region between anterior bevel 34 and posterior bevel 36 and contains bolt cutting/shearing station 24, wire cutting station 26 and stripping station 28. Joint 44 also falls within this region. The contact region consists of the region where anterior bevel 34 causes the overlap region to transition from material overlap to material contact along forming tips 30 and 32. The alignment region consists of the region where posterior bevel 36 causes the overlap region to transition from material overlap to material alignment along crimping station 22 and handles 46. Preferably, the alignment region does not contact in the closed position to allow wire stripping station 28 to precisely overlap. This concept will be discussed further below.

Preferably, each half of crimping station 22, bolt cutting/shearing station 24, cutting station 26, stripping station 28, and forming tips 30 and 32 are constructed integral to form a one piece top arm 40 and one piece bottom arm 42. Preferably, top arm 40 and bottom arm 42 are forged into shape to form each half of tool 20 or top arm 40 and bottom arm 42 are cast into shape by pouring molten metal into a mold to form each half 40 and 42 of tool 20. However, such construction should not be considered limiting, as the various components which form tool 20 can also be die cut or separately attached to tool 20 by conventional means. Tool 20 should be composed of a material that will not become nicked with normal use and will maintain precision, shape and finish. Preferably, tool 20 is composed of a high quality metal such as high-carbon, high-chrome alloy steel, hardened tool steel or stainless steel, etc. and a protective corrosion-resistant black oxide surface finish. However, other materials can be utilized to compose tool 20 and are considered within the scope of the invention, including materials having characteristics of high hardness, strength and durability as well as rust and wear-resistance. Preferably, tool 20 is composed of a material that is harder on the Rockwell hardness scale than the hardest materials tool 20 is designed to manipulate. Preferably, tool 20 features permanently stamped or laser-etched numbers and markings as well as colorful easy-to-read enameled or painted-on application indicators that will not rub off over time.

Since modifications to the prior art consist of removing wire looping holes 27 and changing plier nose 25 to forming tips 30 and 32, only this feature of tool 20 is about to be described for the sake of simplicity and convenience. Therefore, the figures for the present invention will demonstrate the operation of forming tips 30 and 32 only. The operation of stations 22, 24, 26 and 28 remain as conventionally known.

Figure 6:
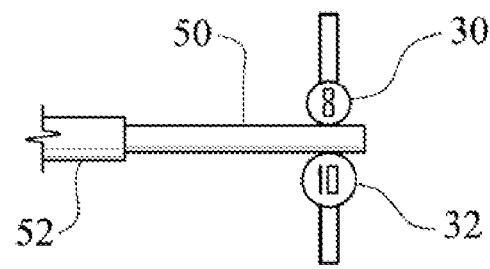
FIG. 6 is a front view taken along lines 6-6 of FIG. 5 and illustrates the wire forming tips, with indicia, engaging a piece of wire at the start of the forming sequence.
Figure 6A:
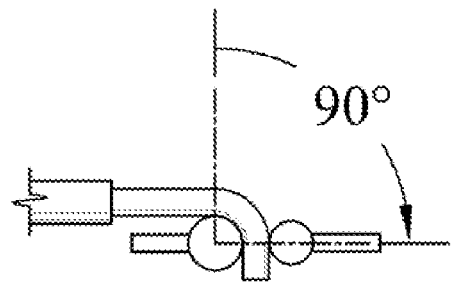
FIG. 6A is the same as FIG. 6 but rotated 90 degrees during the wire forming sequence.
Figure 6B:
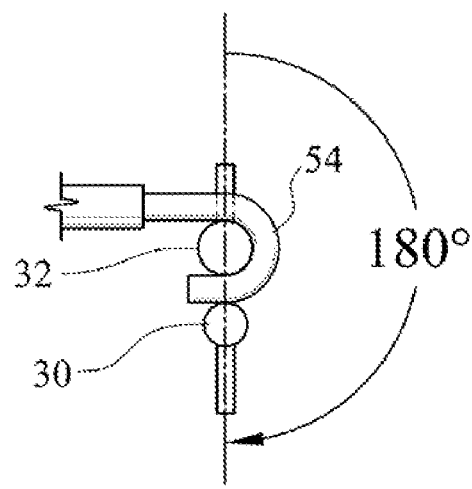
FIG. 6B is the same as FIG. 6 & FIG. 6A but rotated 180 degrees at the end of the wire forming sequence.
Figure 7:
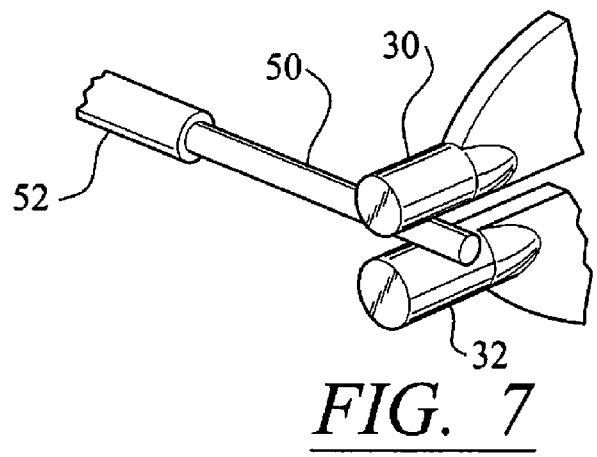
FIGS. 7-7B are perspective views taken along lines 7-7 of FIG. 5 and illustrate the same wire forming sequence as in FIGS. 6-6B.
Figure 7A:
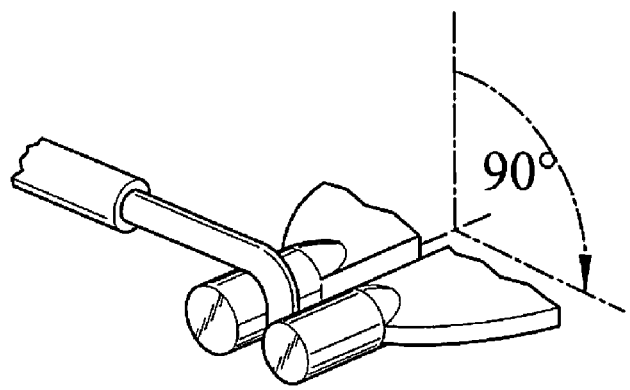
Figure 7B:
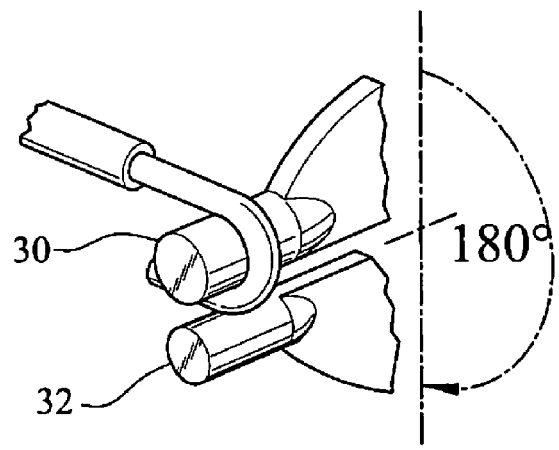

Wire forming tips 30 and 32 consist of upper symmetrically shaped cylindrical barrel 30 and lower symmetrically shaped cylindrical barrel 32. Preferably, barrels 30 and 32 are not the same size with upper barrel 30 smaller in diameter than lower barrel 32. FIG. 6 illustrates forming tips 30 and 32 with indicia distinguishing between two different stud sizes. However, it should be understood that the present invention is not limited to just these two sizes and that forming tips 30 and 32 with indicia corresponding to an array of stud size combinations are considered within the scope of the present invention. Barrels 30 and 32 contact in the fully closed position as is apparent in FIG. 2. Preferably, upper arm 40 and lower arm 42 of tool 20 contact along forming tips 30 and 32 only in the contact region to control the material overlap of wire stripping station 28 in the overlap region. Forming tips 30 and 32 act as a positive stop to allow the machine ground stripping holes 28 to precisely strip wire. By limiting material contact to forming tips 30 and 32 only, tool 20 will accurately maintain the proper amount of overlap at wire stripping station 28.

Preferably, straight bare wire 50, with the appropriate amount of wire insulation 52 removed according to the device manufacturer's instructions, is held securely between upper barrel 30 and lower barrel 32 by squeezing handles 46 with one hand. The pressure applied to the end of conductor 50 between upper barrel 30 and lower barrel 32 is enough to control wire 50 in preparation for forming. Wire loop 54 is formed around either upper barrel 30 or lower barrel 32 by manually rotating tool 20 180 degrees either clockwise or counter-clockwise about a longitudinal axis while maintaining pressure to wire 50 between upper barrel 30 and lower barrel 32. Wire loop 54 is removed from tool 20 by releasing handles and sliding wire loop 54 off of either upper barrel 30 or lower barrel 32. Upper arm 40 and lower arm 42 of tool 20 are spread apart at handle 46 with one or two hands so the wire forming sequence can be repeated.

Figure 8:
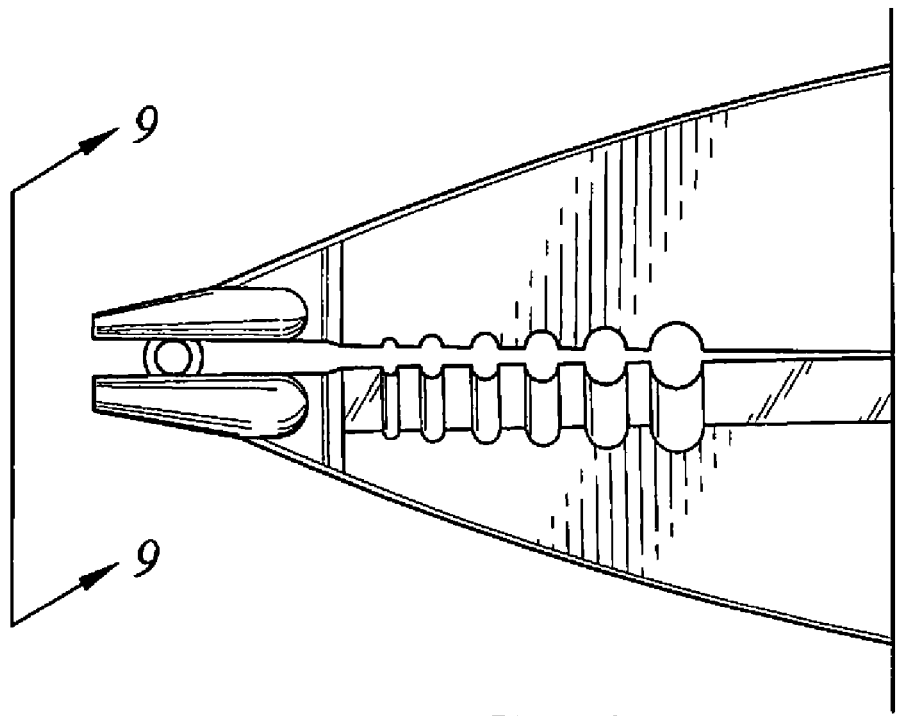
FIG. 8 is the same view as FIG. 5 but with conical wire forming tips as an alternate embodiment of the present invention.
Figure 9:
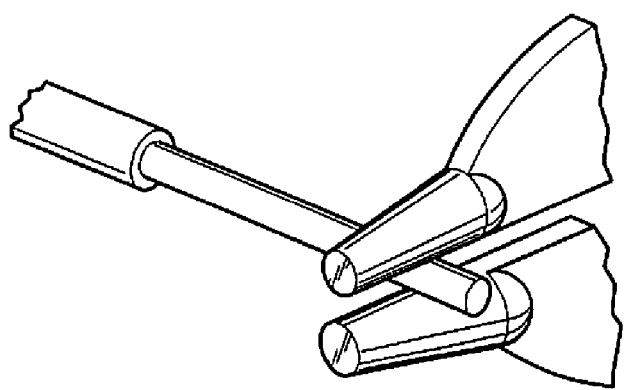
FIG. 9 is a perspective view taken along lines 9-9 of FIG. 8.

Though in the preferred embodiment, forming tips 30 and 32 are provided, it should be understood that such is not limiting and other smoothly shaped forming tips can be utilized and are considered within the scope of the invention. FIG. 8 and FIG. 9 illustrate an alternative embodiment for the present invention wherein two symmetrically shaped truncated cones extend from the anterior ends of the plier tool. Unlike cylindrical forming tips 30 and 32 in the preferred embodiment, the conical forming tips taper gradually and therefore are each graduated in diameter and capable of forming an array of wire loops. However, like cylindrical forming tips 30 and 32 of different diameters, conical forming tips are of different geometries. Combining an cylindrical forming tip with a conical forming tip is also within the scope of the invention. Otherwise, in this alternative embodiment the tool is constructed of similar materials as described in the preferred embodiment and the tool operates and functions similar to the present invention.

Figure 10:
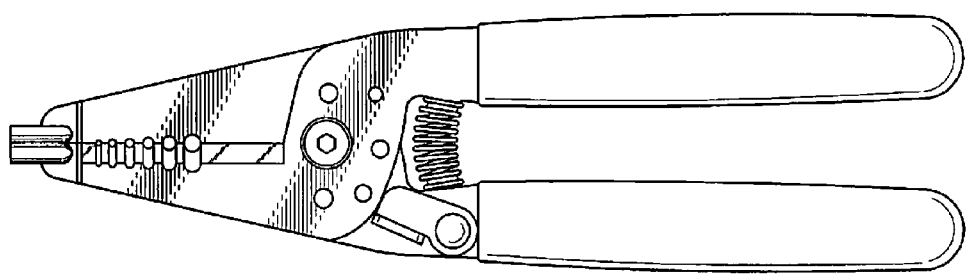
FIG. 10 is a side view of an alternate version of the tool in the closed position illustrating the cylindrical wire forming tips.
Figure 11:
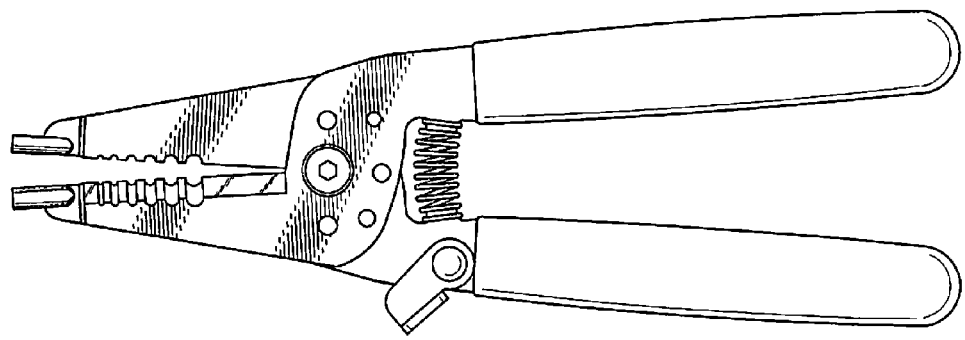
FIG. 11 is the same view as FIG. 10 but in the open position.

FIG. 10 and FIG. 11 illustrate an alternative version for the present invention wherein forming tips 30 and 32 extend form the anterior ends of an alternative version of the plier tool. Crimping station 22 has been removed and replaced with a coiled return spring assembled between the handles. FIG. 10 illustrates the alternative version of the plier tool in the closed position with the coiled return spring compressed and a locking pawl engaged for safe storage of the tool. FIG. 11 illustrates the alternative version of the plier tool in the open position. The spring-loaded automatic opening reduces muscle fatigue and makes the plier particularly suited for repetitive work and smooth and comfortable one hand operation. FIG. 10 and FIG. 11 illustrate an alternative embodiment that is shorter and therefore more compact and light weight than the preferred embodiment. Otherwise, in these alternative versions the tool is constructed of similar materials as described in the preferred embodiment and the tool operates and functions similar to the present invention.

In all embodiments, the forming tips preferably maintain the slim and narrow profile of the tool.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

We claim:

1. An electrical multi-tool comprising:
a first arm having a posterior end and an anterior end;
a second arm having a posterior end and an anterior end, said arms overlapping and secured together by a joint disposed intermediate of said anterior ends and said posterior ends, said posterior ends of said arms form handles for the electrical multi-tool;
a first forming tip disposed at the anterior end of said first arm, said first forming tip comprising a first symmetrically shaped cylindrical barrel having a smooth surface and a first outer end and a second end, wherein said first forming tip having a same cross sectional diameter size for at least a majority of its length from the first outer end to the second end;
a second forming tip disposed at the anterior end of said second arm, said second forming tip comprising a second symmetrically shaped cylindrical barrel having a smooth surface and a third outer end and a fourth end, wherein said second forming tip having a same cross sectional diameter size for at least a majority of its length from the third outer end to the fourth end;
said first arm and said second arm defining at least one tool station in addition to wire forming performed by said first and second forming tips, wherein said at least one tool station is selected from a group consisting of a wire crimping station disposed between the joint and handles, a wire cutting station disposed between the joint and the forming tips, a wire stripping station disposed between the wire cutting station and the forming tips and a bolt cutting/shearing station disposed around the joint;
wherein said first symmetrically shaped cylindrical barrel independent of said second symmetrically shaped cylindrical barrel such that the first symmetrically shaped cylindrical barrel does not contact the second symmetrically shaped cylindrical barrel when the electrical multi-tool is in an open position;
wherein said second symmetrically shaped cylindrical barrel having a diameter size which is smaller than a diameter size of said first symmetrically shaped cylindrical barrel.

2. The electrical multi-tool of claim 1 wherein when said first arm and said second arm are in a fully closed position said first forming tip and said second forming tip contact each other.

3. The electrical multi-tool of claim 1 wherein said first forming tip is constructed integral or monolithically formed with said first arm and said second forming tip is constructed integral or monolithically formed with said second arm.

4. The electrical multi-tool of claim 1 wherein said first forming tip and said second forming tip are adapted to securely hold a portion of a length of bare wire fix forming such wire around either said first forming tip or said second forming tip and without nicking or marring the bare wire.

5. The electrical multi-tool of claim 1 wherein said first forming tip is coded with a first color and said second forming tip is coded with a second color, wherein said second color is a different color than the color selected for said first color.

6. The electrical multi-tool of claim 1 wherein said first forming tip is provided with indicia corresponding to a specific terminal screw size and said second forming tip is provided with indicia corresponding to a specific terminal screw size which is a different terminal screw size as compared to the specific terminal screw size associated with the first forming tip.

7. The electrical multi-tool of claim 6 wherein each specific terminal screw size is defined by a Unified Thread Standard technical standard.

8. The electrical multi-tool of claim 1 wherein said first arm and said second arm defining a wire crimping station disposed between the joint and handles, a wire cutting station disposed between the joint and the forming tips, a wire stripping station disposed between the wire cutting station and the forming tips and a bolt cutting/shearing station disposed around the joint.

9. An electrical multi-tool comprising:
a first arm having a posterior end and an anterior end;
a second arm having a posterior end and an anterior end, said arms overlapping and secured together by a joint disposed intermediate of said anterior ends and said posterior ends, said posterior ends of said arms form handles for the electrical multi-tool;
a first symmetrically shaped cylindrical barrel having a smooth surface disposed at the anterior end of said first arm and serving as a first forming tip, said first barrel constructed integral or monolithically formed with said first arm, said first symmetrically shaped cylindrical barrel having a first outer end and a second end, wherein said first symmetrically shaped cylindrical barrel having a same cross sectional diameter size for at least a majority of its length from the first outer end to the second end;
a second symmetrically shaped cylindrical barrel having a smooth surface disposed at the anterior end of said second arm and serving as a second forming tip, said second symmetrically shaped cylindrical barrel having a third outer end and a fourth end, wherein said second symmetrically shaped cylindrical barrel having a same cross sectional diameter size for at least a majority of its length from the third outer end to the fourth end, said second symmetrically shaped cylindrical barrel having a diameter size which is smaller than a diameter size of said first symmetrically shaped cylindrical barrel, said second barrel constructed integral or monolithically formed with said second arm;

said first arm and said second arm defining at least a wire cutting station disposed between the joint and said first barrel and said second barrel and a wire stripping station disposed between the wire cutting station and said first barrel and said second barrel;

wherein when said first arm and said second arm are in a fully closed position said first barrel and said second barrel contact each other;

wherein said first barrel and said second barrel are adapted to securely hold a portion of a length of bare wire for forming such wire around either said first barrel or said second barrel and without nicking or marring the bare wire;

wherein said first symmetrically shaped cylindrical barrel independent of said second symmetrically shaped cylindrical barrel such that the first symmetrically shaped cylindrical barrel does not contact the second symmetrically shaped cylindrical barrel when the electrical multi-tool is in an open position.

10. The electrical multi-tool of claim 9 wherein said first barrel is coded with a first color and said second barrel is coded with a second color, wherein said second color is a different color than the color selected for said first color.

11. The electrical multi-tool of claim 9 wherein said first barrel is provided with indicia corresponding to a specific terminal screw size and said second barrel is provided with indicia corresponding to a specific terminal screw size which is a different terminal screw size as compared to the specific terminal screw size associated with the first barrel.

12. The electrical multi-tool of claim 11 wherein each specific terminal screw size is defined by a Unified Thread Standard technical standard.

* * * * *